March 24, 1953 H. B. ACKERMAN 2,632,548
JUSTIFYING COMPOSITOR
Filed Sept. 12, 1947 4 Sheets-Sheet 1

INVENTOR
HOWARD B. ACKERMAN
BY
Pennie, Edmonds, Morton and Barrows
ATTORNEYS

March 24, 1953  H. B. ACKERMAN  2,632,548
JUSTIFYING COMPOSITOR
Filed Sept. 12, 1947  4 Sheets-Sheet 2
FIG. 2
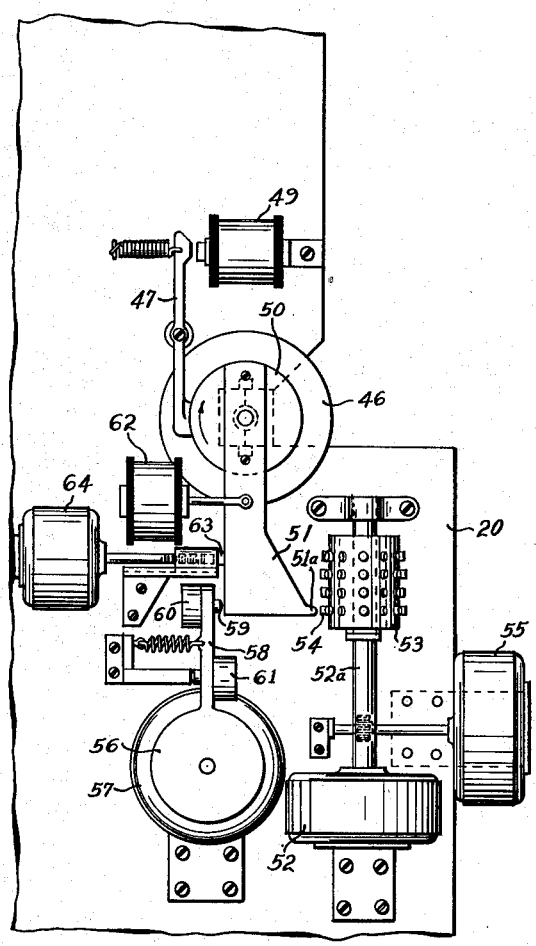
FIG. 3
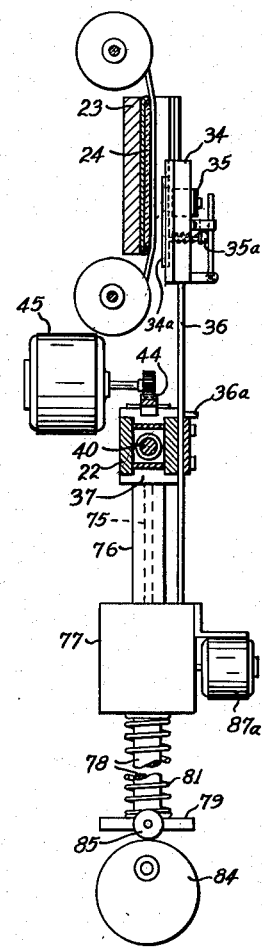
FIG. 4
FIG. 5
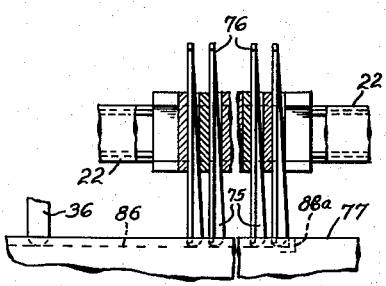
FIG. 6
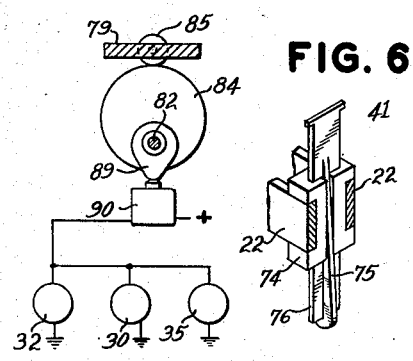
INVENTOR
HOWARD B. ACKERMAN
BY
*Pennie, Edmonds, Morton and Barrows*
ATTORNEYS March 24, 1953  H. B. ACKERMAN  2,632,548
JUSTIFYING COMPOSITOR
Filed Sept. 12, 1947  4 Sheets-Sheet 3

INVENTOR
HOWARD B. ACKERMAN
BY
*Pennie, Edmonds, Morton and Barrows*
ATTORNEYS

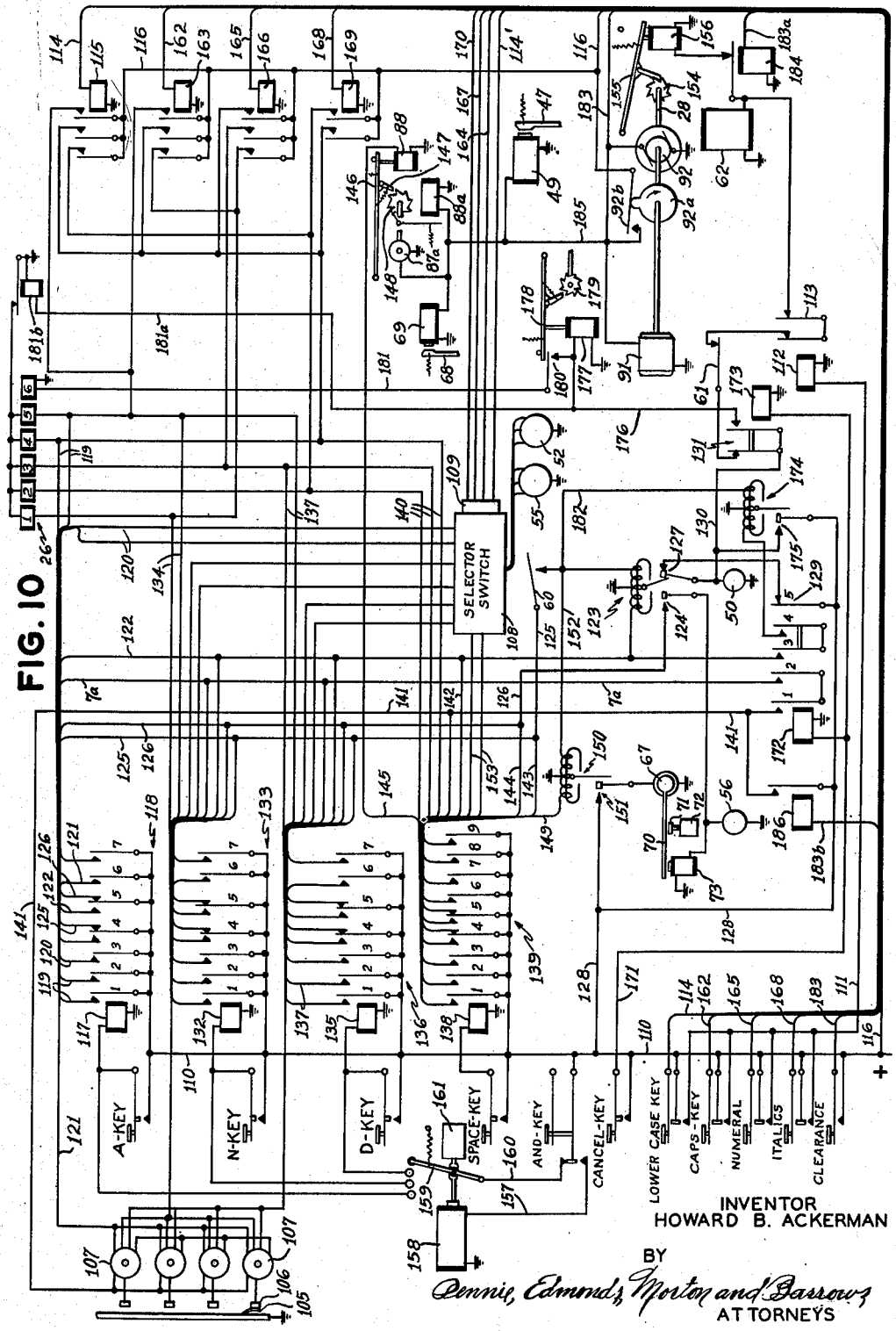

Patented Mar. 24, 1953

2,632,548

UNITED STATES PATENT OFFICE 2,632,548

JUSTIFYING COMPOSITOR

Howard B. Ackerman, Rockville Centre, N. Y.

Application September 12, 1947, Serial No. 773,690

31 Claims. (Cl. 197—1)

My invention relates to improvement in machines for composing text material into or onto a record strip or tape which in turn is adapted to be used for operating a photographic composing apparatus which automatically sets up a text of justified line units preparatory to making printing plates suitable for offset lithography, rotogravure printing or other types of printing. In accordance with the invention, the characters, punctuations and other controlling representations are produced in code signals on the tape. My apparatus may be operated by any skilled typist without a knowledge of type setting or other intricate details generally involved in composing justified lines of text matter.

Many proposals for automatic machines of this general type have been put forward, but for the most part they are too complicated, too expensive, too slow or are lacking in accuracy in the production of justified lines of text matter.

One of the outstanding problems in the composition of the text matter for offset lithography, aside from hand setting, "Linotype" or "monotype" procedures, is the provision of satisfactory automatic means for effecting the justification of the lines of text matter. It is generally recognized that machine methods of justification, so far devised, are not sufficiently accurate or flexible for commercial use. Text matter, in order to be satisfactory, must be accurately set up in justified lines, but so far as known, the only dependable system is the use of hand setting methods which are of course entirely too slow, and expensive.

Another problem in connection with the composing of text matter in justified lines, is that of providing mechanism which is sufficiently fast, flexible and accurate for determining and translating the space values of characters and spaces in a line, and which can approach the results obtained by skilled hand setters.

Various types of mechanisms have been proposed for finding space values and for measuring the width of characters involved in a justified line of text matter. However, the known deficiencies and cost of such apparatus are undoubtedly the reason why they have not been adopted for commercial composition.

In previously proposed machines, it appears to be generally recognized that no suitable means could be provided for cancelling a character representation used in error in a composing operation. In the past, no provision was made for making corrections immediately. Only in the final setup of the photographed text could a substitute word or line unit be used to replace the word or line unit containing the error.

In accordance with the features of my invention I have discovered that accurate and justified lines of text matter may be rapidly and consistently produced by a comparatively inexpensive, simple and compact mechanism which does not involve the handling of type or the use of character-representing elements having the width of the characters to be reproduced. On the other hand, the machine of the present invention produces a tape record, having controlling representations thereon, which is used in a separate machine or apparatus as the control means to produce automatically the justified lines of text matter by photographic means.

Another feature of my invention is the provision of a rapidly acting mechanism for accurately finding and measuring the space values not only of the characters to be presented in the justified lines of text, but also of the spaces in the justified lines. This feature of my invention is based upon the absolute measurement of and utilization of the space between two given points or fixed stops which represent the extremities of the line of justified text matter to be composed. I provide mechanism for rapidly and accurately allotting this line length to the various letters or other characters of which the line is composed, and the necessary spacing between words or groups of characters, regardless of the fact that all of the different characters have different widths in the line.

An important feature of the machine of my invention is the speed with which lines of text matter may be composed, since there is no type or equivalent elements to handle, and therefore no necessity for providing mechanism for manipulating such elements. I have determined that the electrically-operated mechanism of my machine is extremely fast and that the composition proceeds as fast as an operator would care to make the composition, which is several times as fast as any of the methods now in use. In the use of a complete combination apparatus by which the tape record, the photographs and plates of proposed pages of type matter are made for an offset press, it will be apparent that very little storage space is required to keep the photographic negatives, for example, of a complete book, as against the storage space and weight involved in keeping ordinary plates for such a book.

More specifically my improved machine includes a key-operated automatic mechanism, for producing a tape record on which the characters and spaces of a line of text matter are represented by code signals, for successively measuring off on a bar or track the widths of the characters and spaces represented by the signals, for separately measuring off on the same bar or track the width of the spaces, and for dividing the total distance represented by the spaces separately measured off and any additional space or lack of space in the measured line, means for automatically dividing the total space distance to determine the width for the spaces between words to produce a justified line of text matter, and mechanism for recording such space width on the tape in association with the code signals for the particular line of text matter.

Another feature which facilitates the writing of text matter, and increases the speed of the composing operation, is the provision of word keys on the keyboard for the very common words such as "and," "of," "on," "in," and others. The operator merely strikes the key for such a word and the signals for the letters thereof are successively measured off on the apparatus and recorded on the tape.

My improved machine also includes an arrangement whereby the operator can see at a glance the character which he has written. One of the difficulties of previously proposed machines is that in the composing of a text record, the operator neither could see that he had struck the correct key nor make any correction or cancellation if he felt or knew that the wrong key had been struck. My improved machine includes automatic means for making the character of the key struck plainly visible to the operator, and a special key for cancelling the space and any signal which may have been recorded on the tape in error. These features materially add to the accuracy of the text, the speed of the operator, and increase his confidence in composing the lines of text matter.

In addition to the ordinary character keys, and word keys especially associated with a letter key for the beginning letter of the word, the keyboard includes other special keys comprising a "space key," a "cancellation key," a "Lower-case" or "small letter key," a "capital letter" or "Caps key," a "Numeral key," an "Italics key," and a "clearance key."

In the apparatus of my invention the mechanism for cancelling a character representation placed upon the tape in error includes a rapid and effectively accurate means for cancelling the exact space allotted to such character, so that in the final use of the record tape for producing the actual text, the character representation, and its space, placed upon the tape in error, will be entirely ignored and will not affect the final composition.

My improved machine for making a tape record of justified lines of text matter includes a novel and accurate means for providing representations giving the exact length of the individual line or lines of text matter, the size of the type to be printed and the exact spacing between words or groups of characters for each line.

The improved machine of my invention includes other features of importance, objects and advantages, which will be brought out more in detail in the following description of the machine taken in connection with the accompanying drawings which show an illustrative embodiment.

In the drawings:

Fig. 2 is a partial end elevational view taken from the left of the apparatus shown in Fig. 1.

Fig. 3 is a broken elevational view partly in section, taken on the line 3—3 of Fig. 1 and showing the part of the mechanism for printing the justification signal or space length on the record tape.

Fig. 4 is a broken view taken on the line 4—4 of Fig. 1, showing one of the cam switches and an elevating cam in the opposite position to that shown in Fig. 1.

Fig. 5 is a broken elevational view partly in section, showing the space equalizing elements of Fig. 1 in the positions they occupy in justifying a particular line of text matter.

Fig. 6 is a detailed view partly in section, showing the structure and arrangement of one of the space equalizing elements.

Fig. 10 is a circuit diagram showing in a schematic way one preferred form of circuit and mechanism suitable for operating the keys for the letters "A," "N," "D," the word "and," the space key, the back-space or cancellation key, the lower-case letter key, the capital letter key, the numeral key, the italics key, and the clearance key.

Figure 1:
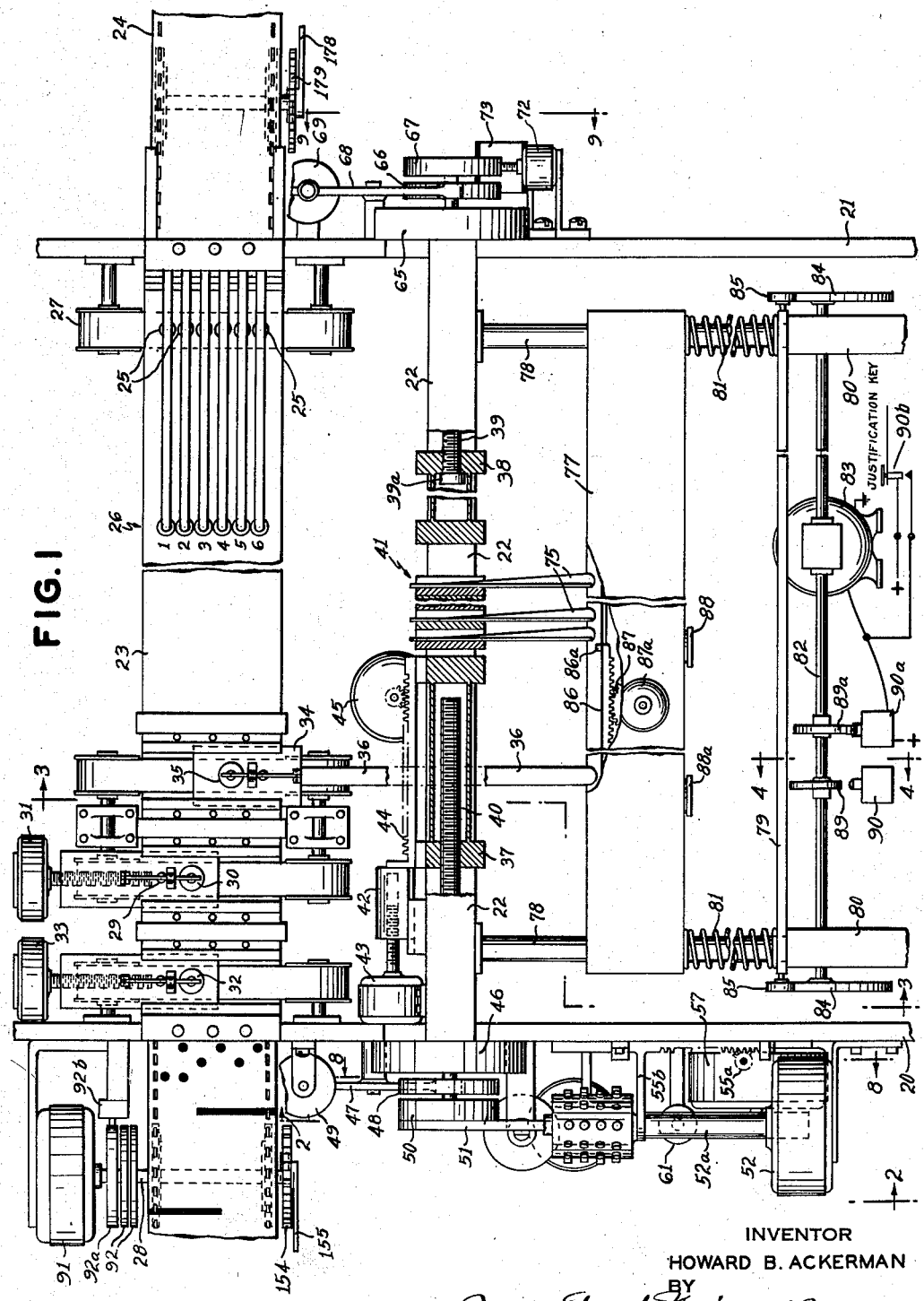
Fig. 1 is a broken front elevational view of a portion of a machine constructed in accordance with my invention, with portions removed, omitted or broken away which are not necessary to a complete understanding of the machine and its operation. Some parts are shown diagrammatically.

*General features and operation of the machine*

The machine of the present invention is primarily conceived to produce a record on a tape or strip, primarily by printing thereon combinations of code spots representing the particular characters of which the justified lines of text matter are composed. The machine also prints on the tape separate bars or lines representing the length of line, the size of type, and the length of the space between words for each line of text matter. The machine determines the length for each of these bars. The machine includes mechanism for printing on the tape a cancellation signal for any particular character code representation which may have been put on the tape in error. Simultaneously, the machine subtracts the particular space for the wrong character representation previously allotted to the line.

The improved machine includes means for laying out a line of given length between two limits or stops, and means is provided for successively measuring off portions of this line-length as the different character and space representations are printed on the tape, from a measuring means representing the different widths of the various characters and space utilized. When the space key is struck a "normal" space length is measured off as a part of the line-length, as for example, the width of the capital letter "N," and a space signal is printed on the tape the same as for any character. A line of text matter is therefore produced in code on the tape by operating the apparatus until the line-length is used up to the character or characters more or less than the assigned line-length.

During this composing operation a mechanism provided on the machine and comprising a part of the justification mechanism is simultaneously operated to separately measure off step by step the spaces between the words used in the line of composition. After the line has been composed the justification key is actuated at the keyboard to set in motion an automatic justification mechanism which makes use of the separate group of spaces or space-equalizing means. This mechanism divides up the total space equally between the number of spaces in the line of text matter, and causes an associated mechanism to record on the tape a bar having a length representing the correct spacing between words of the particular line of text matter.

If a wrong key is actuated, the cancellation or back-space key is next actuated, which electrically actuates mechanism for cancelling the space in the line-measuring means, for stepping the tape back a space, and for applying a cancellation code signal adjacent to or below the wrong signal. The composing operation then proceeds as before.

After the line of text matter has been composed and the justification key actuated, the clearance key is then actuated, which moves the tape sufficiently to clear the printing mechanism and restore the parts of the mechanism used for taking up the line distance with spaces and character representations. At the same time the justification mechanism is restored to its initial position and the apparatus is then ready for composing a new set of character and operating signals for a new line of text.

The apparatus shown in Figs. 1 to 9 may be conveniently described in connection with the functioning of its various parts aside from the electrical circuits involved in effecting the operations from the keyboard.

The signal printing mechanism

Figure 7:
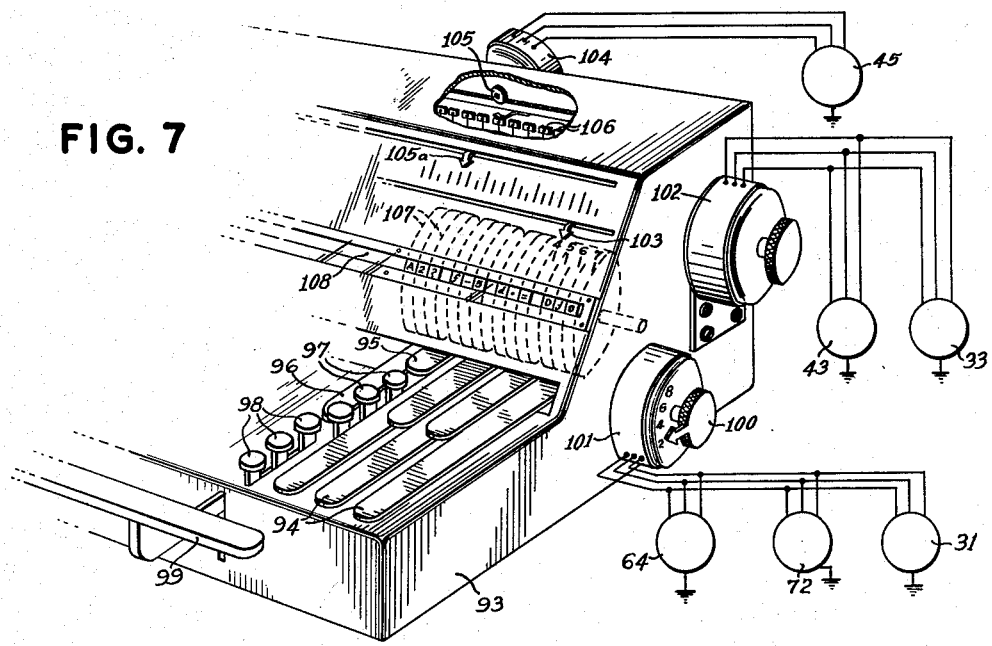
Fig. 7 is a fragmentary perspective view illustrating diagrammatically one form of keyboard and associated elements for use in producing the various character and symbol representations on the record tape, including some of the wiring and associated elements.
Figure 8:
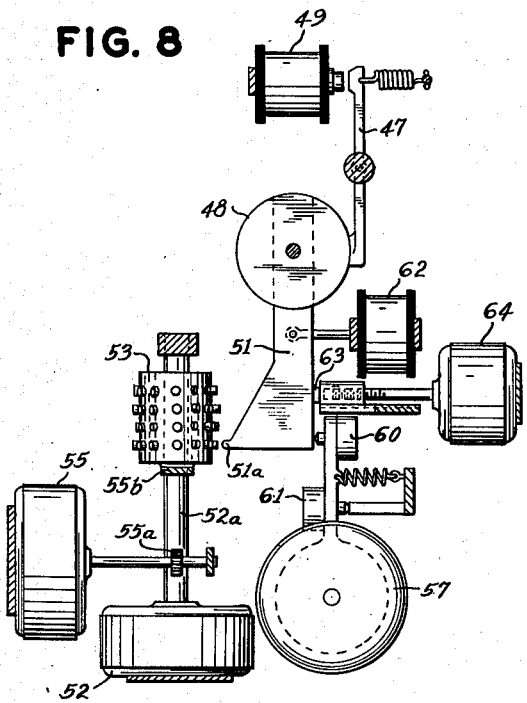
Fig. 8 is a view partly in section, taken on about the line 8—8 of Fig. 1 looking in the opposite direction to that of Fig. 2, and which shows essentially the same apparatus elements.

The apparatus shown in Figs. 1 and 2 includes side panels or frames 20 and 21 which comprise a part of the apparatus assembly, and normally attached to the keyboard frame shown in Fig. 7. These side panels are mounted in spaced relation and carry a pair of parallel spaced horizontal slide-bars 22 and a tape channel or printing frame 23 for a record tape 24. The printing frame 23 carries six vertically arranged spot signal printers 25 numbered 1 to 6 from top to bottom, operated by electromagnets 26 for printing a black spot or a selected group of black spots in a vertical row on the tape 24, a suitable printing die and a conventionally operated inked ribbon 27 being provided for this printing operation. The lower spot printer 6 is for printing a cancellation spot signal for cancelling the spots thereabove. The tape 24 may be of transparent paper or cellulose film and is provided with the usual marginal holes which engage the sprocket teeth of a drum or wheels mounted on an operating shaft 28. A ratchet mechanism for advancing the tape 24, step by step, is attached to the lower end of the shaft 28 and mounted on the panel 20, while a similar mechanism mounted on the panel 21 is provided for reversing the tape, step by step, when character signals printed in error are to be cancelled.

The printing frame 23 carries an electromagnetic printing means 29 operated by a solenoid 30, both attached to a vertically movable slide as shown, for printing a signal bar on the tape representing the size of the type desired. This signal is a black line or bar, the length of which on the tape from the top is determined by a positioning motor 31 of the "Selsyn" type, which rotates a threaded member connected to the slide carrying the printer 29.

A similar printing mechanism including an electromagnet 32 and a motor 33 is used for printing a signal bar on the tape 24 from the top representing the desired length of justified line of text matter to be finally produced. The positioning motors 31 and 33 are operated from the position of the keyboard as described hereinafter. These printers are provided with inked ribbons which are contacted by suitable bar dies when the electromagnets are energized.

The printing frame 23 also carries means for printing on the tape a line or bar representing the length of the space to be used for justifying the composed line of characters. This printing means is like the bar signal printers described above, except that it is operated from the lower edge of the tape 24 so that the printed bar extends upwardly from the bottom of the tape. This means, which is shown in Fig. 1 at the right of the other bar printers, and in greater detail in Fig. 3, includes a vertically movable slide 34 for positioning the printing bar or die 34a which is mounted under the slide adjacent the tape 24 over an inked ribbon, and actuated by an electromagnet 35. The bar 34a has an attached pin 35a which extends through the slide 34 and which is actuated by the electromagnet 35 and a lever as shown. The pin 35a keeps the bar in fixed vertical position, and is advantageously mounted in a vertical slot in the slide so that it is kept accurately in position. A spring on the pin 35a keeps the bar normally retracted from the tape 24, except when the electromagnet 35 is energized. A conventional form of inked ribbon, as shown, is provided for printing the bar signal on the tape 24.

The length of line and size of type printers are constructed like the printing mechanism shown in Fig. 3. The vertical position of the slide 34 and the bar die 34a is determined by a justification push rod 36 which is moved to the correct position before the electromagnet 35 is energized. A stop 36a on the rod 36 and supported by one of the bars 22 fixes the lower limit of the rod 36.

The line composing means

The means for stepping off the widths of various characters, punctuations, and the spaces between words is carried on the parallel crossbars 22 and comprises a yoke 37, Fig. 1, which is moved in successive stages to the right, according to the width of the various characters, punctuations and spaces used in composing a line. A yoke 38 is also on the bars 22 which is moved to the right a step for each space between words or groups of characters. The yoke 38 is operated by a worm 39 and an electromagnetically-operated stepping mechanism mounted on the outside of the panel 21 while the yoke 37 is operated by a similar worm 40 and an associated stepping mechanism mounted on the outside of the frame 20, the worms being rotatable in fixed positions.

The parallel bars 22 also carry between the yokes 37 and 38 a plurality of space equalizing units 41 shown more in detail in Figs. 5 and 6, and comprising in number more than the maximum number of spaces which would be used in any line of justified text matter. The yokes 37 and 38 will assume a fixed initial position with respect to each other when the worm 40 engages the inner end of the yoke 37, and the shouldered enlargement 39a on the end of the worm 39 is against the yoke structure, as shown. These positions of the yokes would represent the maximum line length obtainable on the machine, and of course, the machine may be made for any maximum length of line. The machine, as shown, is provided with means for adjusting the line-length comprising a slide stop 42 operated by a positioning motor 43 and a screw or worm, as shown. The yoke 37 is also provided with a rack 44 which moves with the yoke and causes a positioning generator 45 to register the movement of the yoke on the face of the keyboard by electric impulses to a motor-driven mechanism shown in Fig. 7 and referred to hereinafter.

The means for actuating the worm 40 which is attached to, or continues as, a shaft, through the panel frame 20, includes a conventional clock spring member attached to the shaft and mounted in a casing 46 for rotating the worm 40 to move the yoke 37 to its stop position to the left when the shaft is released. Normally the shaft is held against rotation by a spring operated brake lever 47 operating on a brake drum 48 fixed to the worm shaft. The brake is released, and the spring in the casing 46 allowed to act on the worm by the actuation of an electromagnet 49, as will be more clearly understood from the showing in Fig. 2 of the drawings.

The step-by-step actuation of the worm 40 is effected against the holding action of the brake lever 47 by means of an electromagnetic clutch means 50, which, when energized, rotates the drum 48 and shaft of the worm 40, not only against the action of the brake lever 47, but also against the spring in the casing 46, to move the yoke 37 to the right. This movement is step-by-step and is effected by the movement of an arm with extending anvil-like measuring member 51 attached to the clutch member 50.

*The character measuring mechanism*

The member 51 and its movement within certain variable predetermined limits is made use of in measuring the distance which the yoke 37 is moved in one step, which is the width of a particular character, plus the space required between characters, or space. The distance which the yoke 37 is moved in one step is, for example, the width of a particular letter of an existing style of type. It is understood that the different characters in the existing styles of type have different unrelated widths. In the present apparatus means is provided for accurately measuring the width of each character as its key is struck on the keyboard, so that the yoke 37 is moved a distance corresponding to the width of the character.

This mechanism is shown more completely in Fig. 2 of the drawings, since it is mounted on the side of the frame or panel 20. When the key for a particular letter, for example the letter "A" (lower-case), is struck on the keyboard, a rotary selector switch, shown in the wiring diagrams, is operated to cause a motor 52 to rotate a pin cylinder 53 on a shaft 52a to a position so that the vertical row of pins 54 containing the lower-case letter "A" pin, is presented opposite the lower right-hand point or head of the lever member 51. At the same time a positioning motor 55 operates a rack and pinion 55a, the rack carrying the pin cylinder 53 on an arm 55b to move it up or down until the horizontal row of pins containing the letter "a" pin is positioned opposite the head 51a of the member 51. The "a" pin is now in a position to be struck by the member 51.

When the "a" key on the keyboard is released, a magnetic clutch 56 is energized and engages the shaft of a continuously operating motor 57, causing an arm 58 attached to the clutch 56 to rotate clockwise against the action of the spring, as shown, so that a push button 59 of a switch 60 mounted on the arm 58 moves against the lower back portion of the member 51 to force it into engagement with the "a" pin on the cylinder 53. This action closes the switch 60 to cause the magnetic clutch 50 to be energized and the circuit to the clutch 56 to be deenergized, so that arm 58 flies back counter-clockwise under the action of the spring attached thereto, to close a switch 61 mounted on the arm, the bottom of which engages a stop, as shown.

The closing of the switch 61 energizes an electromagnet 62 which pulls the lever arm member 51 clockwise against an adjustable stop 63. Since the clutch 50 was energized before operation of the electromagnet 62, the movement of the lever arm 51 in a clockwise direction rotates the worm 40 and thereby moves the yoke 37 to the right in Fig. 1, the distance corresponding to the width of the letter "a" type.

It will be understood that since the arm 58 is held under the action of its spring, the switch 61 is normally closed so that the electromagnet 62 also normally holds the member 51 against the stop 63. Therefore, the first action which takes place after the clutch 56 is energized, is the opening of the switch 61 to deenergize the electromagnet 62 and permit the movement of the arm 51 toward the pin cylinder 53. When sufficient pressure is applied to the button 59 of the switch 60 during this movement, this switch will be closed to perform the functions described above.

The mechanism shown in Fig. 2 includes a positioning motor 64 and a worm threaded to the stop 63, the motor being operated from the keyboard to adjust the stroke of the arm 51 so that the measurements obtained from the pin cylinder will correspond to a selected size of type. The pitch of the thread of the worm 40 is correlated with the stroke of the arm 51, so that the width of the character measured by the arm 51 is accurately translated to the yoke 37.

The pins on the cylinder 53 represents the different letters in the alphabet, numerals, punctuations and other characters, as well as the "normal" space between words (the width of the capital letter "N"). These pins are of different lengths and one pin may serve to measure two or more characters if the type of such characters are of the same width. The pin cylinder may have a pin for each character and in an advantageous structure have six vertical rows of 26 pins each, so that a selector switch will not be needed. The pins may project different distances from the axis of the cylinder so that the difference in length of any two pins represents the difference between the widths of the particular characters which these pins represent. The wider the character the shorter the pin.

The spacing and justifying mechanism

When the space key on the keyboard is struck a space code signal either printed or punched is of course made on the tape 24 and the yoke 37 is moved the normal "N" space to the right. At the same time mechanism is operated to move the yoke 38 to the right in Fig. 1 by rotation of the worm 39. The worm 39 extends between the parallel members 22 in axial alignment with the worm 40 and rotates in fixed position from a shaft extending to the right, as shown.

The worm 39 is actuated in one direction by a clock spring attached to the shaft and enclosed in a casing 65 similar to the casing 46. The brake drum 66 is also attached to the worm shaft along with an electromagnetic clutch 67. A spring-actuated pivoted brake lever 68 normally bears on the drum 66 in a manner identical with that of the lever 47. The lever 68 is released under certain conditions by the operation of an electromagnet 69, corresponding to and energized at the same time as the electromagnet 49.

Figure 9:
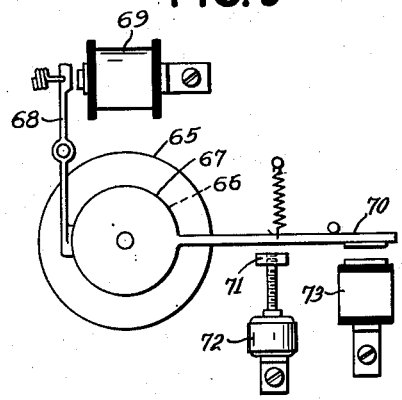
Fig. 9 is a view taken on the line 9—9 of Fig. 1 showing a part of the actuating mechanism for measuring off the spaces in a line of text.

The step-by-step actuation of the yoke 38 to the right is effected by mechanism more completely shown in Figs. 9 and 10, in which the clutch 67 is shown as being provided with an arm 70 held up against a fixed stop by a spring, as shown. The arm 70 overlies an adjustable stop 71 actuated by a positioning motor 72 and worm, as shown. An electromagnet 73 is provided for drawing the arm 70 in a downward direction. The positioning motor 72 is actuated from the keyboard as shown in Fig. 7 to provide the normal "N" space for the particular text matter to be written. The stop 71 is positioned for the stepwise movement of the yoke 38 the same distance and direction as the yoke 37 when the space key is actuated.

A number of different parts of the apparatus is actuated by the space key, including the energizing of the electromagnetic clutch 67, so that it grips the shaft of the worm 39. Immediately after this happens, the electromagnet 73 is energized to draw the arm 70 down, thereby rotating the worm 39 and moving the yoke 38 to the right on the slide bars 22.

Other mechanism for effecting the justification of line of text matter is shown in Figs. 1, 5 and 6, including the space equalizer units 41 involved in the justification procedure and mechanism. Each of these units, as shown in Fig. 6, includes a yoke 74 slidably mounted between and on the bars 22, each yoke being solid on one side between the bars and slotted on the other to receive a vertically movable wedge member 75 comprising a part of a slide 76 having top shoulders which normally rest upon the yoke 74. The slide 76 moves freely in a vertical slot in the yoke 74. All of the wedge members 75 and slides 76, as well as the yokes 74, are of the same size and shape, and the slides with their wedge members, which may be integral, normally hang freely on the yokes 74, so that the bottoms of the wedge members are at the same level.

The mechanism for actuating the justification push rod 36 and the wedge slides includes the means mounted between the side panels 20 and 21 and below the bars 22 which comprise a vertically movable cross-frame 77 having vertical end holes through which vertical posts 78 extend, the posts being fixed to the bars 22, and at their bottoms by means, not shown. A bar 79, having end holes, is also mounted on the posts 78, and rests on fixed bottom supports 80. Springs 81, on the posts 78, serve to keep the cross-frame member 77 spaced from the bar 79. A rotatable horizontal shaft 82 is mounted in bearings in the supports 80, and operated by a motor 83. The ends of the shaft 82, outside the supports 80, are provided with fixed similar cams 84 which engage rollers 85 mounted on the ends of the bar 79.

The cross-frame member 77 is mounted directly under the member 36 and the suspended wedges 75, so that these members ride between side shoulders and slightly above the level of a horizontally movable plate 86 slidable lengthwise in the cross-frame 77 and having an upwardly extending end lip 86a. The plate 86 is provided with a rack, as shown, which is operated by a pinion 87, on a shaft common to that of an electric motor 87a.

The plate 86 is always under the member 36, and its right end so positioned that in the composing of a line of text matter, the first actuation of the space key moves the plate 86 to the right under the first wedge 75. This is accomplished by energizing an electromagnet 88 which operates a ratchet wheel attached to the shaft of pinion 87, as more particularly shown in Fig. 10. As the composition of the line proceeds, the plate 86 moves under a succeeding wedge 75 every time the space key is struck. The composed line may include a number of spaces and when completed the plate 86 will have been advanced to the right under an equal number of wedges 75.

The mechanism for operating the plate 86 includes an electromagnet 88a which, as shown in Fig. 10, releases a retaining catch for the ratchet wheel, so that the motor 87a can be operated to retract the plate 86 to its normal position with its right end adjacent to the first wedge 75. As plate 86 is moved step-by-step to the right, the lip 86a passes under the wedges 75.

The justification of the line is effected by the operation of a justification key on the keyboard which energizes the motor 83 to rotate the shaft 82 and cams 84 to elevate cross-frame 77 up as high as it will go in moving the wedges 75 in their respective yokes. As the wedges 75 are moved upwardly, they will tend to spread the yokes 74 apart to the right and the last wedge will engage the lip 86a to slide the freely movable plate 86 along so that the plate will be kept under the wedges involved in the justification operation. The elevation of the cross-frame 77 is stopped when the wedges separate the yokes 74, until all space between the yokes 37 and 38 is completely taken up.

The cams 84 make a complete revolution so that when they elevate the bar 79 to maximum height, the springs 81 absorb the movement which cannot be taken up by the cross-frame 77. At about the maximum point of the cams 84, a cam 89 on the shaft 82 operates a switch 90, which in turn supplies current through the grounded electromagnets 30, 32 and 35 of the bar printers, in the manner shown in Fig. 4, to print the respective bars including the justification bar on the tape 24. As the cams 84 return to the minimum position shown in Fig. 1, the member 36 and the wedges 75 drop back into the position shown.

The motor 83 on the shaft 82 is operated to provide a complete revolution for the cams 84 by providing a holding switch arrangement for the motor. This comprises a cam 89a concentric to the shaft 82 and having a notch therein, into which the button of a holding switch 90a normally extends. The justifying mechanism is actuated as described above, by striking the justification key on the keyboard which is represented diagrammatically in Fig. 1 by the key 90b. When this key is struck current is supplied by the circuit, as shown, to the motor 83 which begins to rotate the shaft 82, including the cam 89a, thereby moving the button of the switch 90a to closed position, so that when the key 90b is released by the operator, current is supplied through the switch 90a to the motor 83, until the cams 89 and 89a make a complete revolution and the button of the switch 90a re-enters the notch in the cam 89a and thereby cutting off the current to the motor 83.

In the operation of the wedges 75, as above described, it will be noted that a predetermined space distance was allowed between words, therefore, for example, if the line was six inches long and contained eleven spaces, and the composition came out so that the last letter occurred on the marginal line, the bar or mark made on the tape 24 by the solenoid 35 would represent the normal "N" space previously assigned. If the last letter would go beyond the marginal line, the wedges 75 would not move up the full "N" space but in each of the eleven spaces or eleven wedges would absorb an equal amount of this coverage and in the justification operation the solenoid 35 would print a bar representing a space slightly shorter than the normal "N" width.

If the last letter in the composed line would go short of the marginal line, that is, the yoke 37 not be moved the full length of the intended line, the wedges 75 would be moved up for slightly more than the full "N" space, and the eleven spaces measured off by the yoke 48, and the extra space, would be absorbed equally by the eleven wedges, and in the justification operation the solenoid 35 would print a bar on the tape representing a space slightly longer than the normal "N" width.

In general, the wedges 75 are so constructed in connection with the other elements on the slide bars 22 that they would be moved up approximately half-way for a normal "N" space, so that there will be ample range for using a space greater or less than "normal" when the line of text matter is justified. It will be understood that in composing any one line of text matter, some of the wedges to the right will not be used, and that they will have no effect upon the justification of the line of text matter because the yokes 74 merely ride inactively on the bars 22 between the yokes 37 and 38.

The clearance mechanism

After a line of text matter has been composed and justified by the apparatus as described above, the clearance key on the keyboard, and shown in Fig. 10, is operated in order to set the apparatus for the next line. Figs. 1 and 10 show the apparatus in this cleared condition, but after the composition of a line of text matter the yokes 37 and 38 will be substantially to the right. The clearance key, therefore, actuates the electromagnets 49 and 69 to release the brakes, so that the springs in the casings 46 and 65 quickly return the respective yokes to their initial positions shown in Fig. 1, and actuate a motor 91 and a clutch mechanism 92 to rotate the shaft 28 to thereby move the tape 24 to the left the necessary distance to start the next line.

It will be noted that the signal printers 25 operate on a certain portion of the tape which moves along step by step until the first character signal printed in a line may approach the position of the justification printer. The justification bar, the length of line bar, and the size of type bar, will therefore appear on the tape in advance of the particular line to which they apply, as shown on the left end of the tape. Since these three printers are spaced apart, they may be actuated simultaneously, as pointed out above. The tape therefore will be moved a sufficient distance by the motor 91 to leave the necessary space for printing the justification, length of line and size of type bars after the next line itself is composed.

The rotation of the shaft 28 to effect the movement of a full line length or more of the tape 24, is accomplished by providing means for holding the current on the motor 91 until it makes a complete revolution. Gears or other means may be used between the motor and shaft 28 so that the correct amount of tape will be moved forward in one revolution of the motor.

The mechanism as shown at the upper left in Fig. 1, and also in Fig. 10, includes a cam 92a concentrically mounted on the motor shaft and having a knob thereon which opens a switch to cut off the motor 91 after it makes one revolution. The current on the electromagnetic clutch 92 is also held on by this switch so that both are de-energized when the knob on the cam 92a re-engages the switch button after a complete revolution. As stated above, the motor 91 is initially started by actuation of the clearance key. This moves the knob on the cam 92a off the holding switch. The motor 91 and upper active part of the clutch 92 are entirely disconnected from the shaft 28 except when the magnetic clutch 92 is energized.

The actuation of the clearance key also energizes the motor 87a for retracting the plate 86 to its initial position, the motor 87a being wired in parallel with the motor 91 and its switch, as described above, so that ample time will be permitted for retracting the plate 86. At the same time that the clearance key energizes the electromagnets 49 and 69, it also energizes the electromagnet 88a to release the catch on the ratchet wheel mounted on the shaft of pinion 87, so that the motor 87a can retract the plate 86.

The keyboard

A conventional typewriter style of keyboard may be used for operating the mechanism of the present invention, but it will of course include certain special keys and other special features which are of considerable importance. As far as known, previously proposed compositors are not provided with a mechanism so that it is possible for the operator to see what he has written. Therefore, the keyboard of the present invention includes as a special feature a mechanism and arrangement by which the operator can see at a glance exactly the character written by the last key struck.

The portion of the keyboard and associated elements are shown diagrammatically in Fig. 7 of the drawings in which the mechanism is mounted in and on a frame 93 in which keys 94 are advantageously mounted in the manner shown, the keys to the right preferably being clearance and other special keys, while keys 95 and 96 represent particular letters of the alphabet. While the standard typewriter key arrangement is preferably followed, the keyboard proper advantageously includes word keys directly in front of a particular letter key. For example, the key 95 may represent the letter "O," while the three word keys 97 immediately forward, may represent the common words "on," "of" and "or," or other words of two, three or more letters.

The word keys 98 similarly represent different common words beginning with the letter of key 96. The usual spacer bar 99 is the space key and of course corresponds to the position of the spacer bar on a typewriter. All of the keys, as explained above, including the key or bar 99, are merely part of electrical switches which close circuits for accompanying the operations described above.

A hand knob 100 with an indicator pointing to a scale of numbers is provided at the side of the frame 93 for selecting the size of type desired. The knob 100 is mechanically connected by conventional means, not shown, to a positioning generator 101 of the Selsyn type, mounted on the side of the frame, which is wired by a three-wire system, as shown, to the three positioning motors 74, 72 and 31, shown in Figs. 1 and 2, to perform their functions as described above.

The frame 93 also carries a Selsyn generator 102 provided with a knob as shown, for operating motors 43 and 33 for setting the length of line in the manner described above. A pointer 103 on the front of the frame for the mechanism may be moved to the desired point on the scale, representing the length of line desired. The scale, as shown, includes only the numbers 4, 5, 6 and 7, representing the length of line in inches in each instance. The scale of course may be longer and include other numbers or other scales of measurements. The generator 102 is wired by a three-wire system, as shown, to the motors 33 and 43. Positioning mechanism of this type and its operation is generally understood by those skilled in the art and need not be described in detail. Other types of mechanism may be employed for adjusting the length of line measuring and printing means, as well as the size of type determining mechanisms.

The rack-operated positioning generator 45, as described above, is wired by a three-wire system, as shown in Fig. 7, to a Selsyn positioning motor 104 which operates a rack and pinion 105 and an indicator 105a, to register on the face of the keyboard the amount of line of text matter which has been measured off and recorded on the tape. As the yoke 37 in Fig. 1 is moved step by step, the indicator hand 105a moves across the face of the keyboard frame in the same manner for each character or space signal recorded on the tape. The operator therefore knows at a glance when he has finished the line of text matter.

At the same time that this operation is going on, a spring contact member on the rack 105 successively engages a series of fixed contacts 106 representing the position for each character and space in the line. These contacts are wired to individual character wheels 107 rotatably mounted close together on a shaft across the frame of the typewriter and directly in back of a window slot 108. The electrical arrangement is such that when one of the contacts 106 is engaged by the spring contact on the rack 105, the corresponding character wheel 107 is actuated so as to display the particular character or space in the slot 108, and in its proper order in the line of text matter being composed.

The operator therefore sees at a glance the character which he has caused to be recorded on the tape, and if this character is in error he merely actuates the cancellation key, which may, for example, be the right-hand key 94 on the keyboard and the key of the character to be cancelled, thereby carrying on the operations described above in connection with the cancellation of an incorrectly recorded character or signal.

The character wheels 107 are shown only diagrammatically, but are preferably individually lighted by a small electric lamp so that the character displayed in the window slot 108 will be readily brought to the operator's attention. After a line of text matter is composed the operator may, if derired, read the entire line through the window 108 before he actuates the clearance key. The character wheels comprise small electric motors arranged for acutation by the operation of the keys on the keyboard so as to display the correct character. Each wheel 107 includes on its periphery all of the letters of the alphabet, as well as other characters, such as numerals, punctuations and blank for space. The character wheels may each comprise two or three parallel annular compartments, the periphery of one of which will show letters of the alphabet, the other, numerals and punctuation marks, and still another for other characters with a three-compartment wheel, if necessary. The periphery of the compartment adjacent the letter section of the wheel will have opposite any given letter, the numeral or punctuation or other character on a particular key.

The wheels 107 include Selsyn type positioning motors of well-known characteristics having a stator made up of a plurality of pairs of coils, according to the number of positions desired, the coils of each pair being diametrically opposite each other and connected in series. The motor includes a rotor with north and south poles and comprises an electromagnet having a coil connected to two slip rings, one of which is connected to ground. The pairs of stator coils are connected in parallel and to the other slip ring, and each pair of coils has a single lead or connection for the supply of current. When current is supplied to one pair of stator coils the rotor swings instantly into position with its poles adjacent and aligned with the opposite poles of the stator coils.

The wiring arrangement for the character wheels 107 is shown in the wiring diagram of Fig. 10. This is necessarily a diagrammatic showing only, and it will be understood that the contacts 106 may be wired to a rotary switch for the actuation of the different wheels or wheel compartments instead of to the rack arrangement 105. In any case, the arrangement is advantageously such that the correct character wheel will always be actuated, regardless of the width of the letters or other characters used in composing a line of text matter.

*The wiring diagram*

Fig. 10 shows a wiring diagram illustrating a circuit arrangement for certain character keys and a word key used as examples, and an arrangement for all special keys, such as the space key, cancellation key and others. It will be understood that the wiring diagram shows primarily only the wiring associated with keys of the keyboard and not the wiring for some of the other mechanism, and that some of the letter keys, such as 95 and 96, shown in Fig. 7, incluude other characters such as numerals and punctuations, also that when the operator wishes to write a numeral, he will first strike a special numeral key, the same being true for writing capitals, lower-case letters and italics.

All of the keys shown in Fig. 10 are arranged in a vertical row at the left of the figure, and when a special key such as a capital letter "Caps" key is operated, the printing mechanism previously described in connection with the printers 25 will print on the tape or strip a signal corresponding thereto. The several keys arranged above one another in Fig. 10 are designated by their names.

Fig. 10 also includes a diagrammatic showing of most of the motors and electromagnets shown in Figs. 1 to 9 of the drawings, as described above, particularly where these elements are actuated by keys on the keyboard. In the center of the wiring diagram is a rotary selector switch 108 which is of conventional type construction and which is arranged for making many different connections. It may incluude a central rotor or movable member 109 or setting switch which is set for writing lower-case and capital letters, numerals and italics. Punctuations may be included with the numeral selector. The diagrammatically shown rotor 109 of the switch 108 is illustrated as being set by current sent through four wires, 114', 164, 167 and 170, respectively, upon actuation of the lower case, caps, numeral and italics keys, as described hereinafter. When current flows through either of these wires it causes the rotor 109 to move to the desired circuits in the selector switch. While, as stated, the apparatus is not limited to a rotor to set the selector switch, the rotor 109 may be rotated by a contained four-position Selsyn motor grounded to the casing, the four wires being respectively connected to the four positions of the motor.

The provision of such a selector switch is of importance because the different characters have different widths, and therefore must be measured on different pins 54 of the pin cylinder 53, shown in Figs. 1 and 2. The selector switch 108 is therefore wired by three wires representing the letters "a," "n" and "d," as illustrated, to the positioning motors 52 and 55, both of which are grounded, as shown. It will be understood that there are as many wires to the motor 52 as there are vertical rows of pins on the pin cylinder 53, and that there are as many wires to the motor 55 as there are horizontal rows of pins on the pin cylinder 53. The six grounded printing magnets 26, numbered 1 to 6 respectively, shown in Fig. 1, are shown at the top of the wiring diagram with their vertically extending lead wires.

The "Lower-case" letter key

The illustrated wiring arrangement shown in Fig. 10 may be conveniently described in connection with a specific example of a composing operation in which the particular line to be composed begins with the word "and" in lower-case standard type letters. Assuming that the apparatus has been cleared and a "standard type" signal put on the tape by a circuit like that for "Italics," the "Lower-case key" is actuated by the operator to connect up two circuits to a vertical current supply wire 110 extending vertically through the wiring diagram directly to the right of the keys. One of these circuits is in common with the capital letter, "Caps" key, the "Numeral key" and "Italics key," and includes a wire 111 connected to a grounded electromagnet 112, to operate a switch 113 which interrupts the circuit including the switch 61, which is normally closed and which would, as pointed out above, actuate the electromagnet 62 and the ratchet mechanism for advancing the tape 24 step-by-step to the left.

The actuation of the lower-case letter key also supplies current by a wire 114 to energize an electromagnet 115 (upper right) which closes a three-switch relay, as shown, to supply current simultaneously to signal printing (or punching) magnets 26, numbered 2, 4 and 5, which is the lower-case letter signal. A wire 116 connected into the lower end of the wire 110 supplies current to the switches operated by magnet 115. A wire 114' branching from the wire 114 supplies current to the member 109 of the selector switch 108 to set this switch, so that when a letter key is actuated, it will cause the positioning motors 52 and 55 to present the proper pin for the measurement of the lower-case letter.

When the lower-case letter key is released, the switch 113 closes so that current is supplied to the ratchet mechanism on the shaft 28 to move the tape one step to the left.

The character key circuit and operation

The next step in the operation suggested above, is the actuation of the "A" key which is the upper key in Fig. 10. When it is actuated, current is supplied from the main current wire 110 through the key switch to an electromagnet 117, to actuate a seven-switch relay 118, the switches being in a row, to supply positive current through the first and second switches and a pair of wires 119, respectively, to the number 4 and 5 electromagnets 26. The third and fourth switches 118 supply current through wires 120 to the selector switch 108 which is actuated to supply current through positioning motors 52 and 55, so that they select the measuring pin 54 corresponding to the width of the lower-case letter "a." The three wires to each of the positioning motors 52 and 55, as illustrated in Fig. 10, are for the letters "a," "n" and "d." For example, when current is supplied through wires 120, the "a" wires, it is directed through the selector switch 108 and the respective "a" wires to the positioning motors 52 and 55. The positioning motors 52 and 55 are of a well-known Selsyn type having a stator made up of a plurality of pairs of coils, according to the number of positions desired, the coils of each pair being diametrically opposite each other and connected in series. The motor includes a rotor with north and south poles and comprises an electromagnet having a coil connected to two slip rings, one of which is connected to ground. The pairs of stator coils are connected in parallel and to the other slip ring and each pair of coils has a single lead or connection for the supply of current. When current is supplied to one pair of stator coils the rotor swings instantly into position with its poles adjacent and aligned with the opposite poles of the stator coils. The sixth switch 118 supplies current through wire 121 to the character wheel 107 which is connected by its contact 106 to the grounded rack 105, so that the letter "a" is made visible in the slot 108 of Fig. 7. The wire 121 is for the letter "a," one of 26 or more wires respectively for the different characters to be displayed. The wire 121 is connected as shown to the "a" position for all of the wheels 107, however, only the wheel connected to ground by the rack 105 will be actuated.

The fifth switch 118 supplies current through a wire 122 to the left side of a polarized relay 123 and to ground, thereby closing a switch 124 and setting up a circuit for current supply and use when the "A" key is released.

The seventh switch of each of the letter keys "A," "N," and "D," and a commonly connected wire 7a, provides a circuit used when the cancellation key is operated followed by the operation of the key for the character to be cancelled.

As soon as the "A" key is released by the operator, magnet 117 is deenergized and the switches 118 move to their normal positions, the fourth and fifth switches, as shown, then supply current from the main wire 110 through wires 125 and 126, the wire 125 leading to the normally open switch 60, also shown in Fig. 2. Current supplied through the wire 126 flows through the closed switch 124 to the electrically operated clutch 56 associated with the motor 57, which is separately wired and running, thereby actuating the arm 58 in Fig. 2 to move the arm or lever member 51 into contact with the correct pin 54, for the letter "a."

The movement of the clutch arm 58 opens the switch 61 and closes the switch 60 so that current is supplied through the wire 125 and the switch 60 to the right-hand side of the polarized relay 123, thereby moving this relay to its opposite and normally closed position to open switch 124 and close a switch 127, so that current is supplied from wire 110, a wire 128 and a closed switch 129, through the wires, as shown, to the clutch 50 associated with the motor 46 in Figs. 1 and 2. The opening of the switch 124 releases clutch 56 so that the spring associated with arm 58 in Fig. 2 retracts this arm and closes the switch 61 which energizes an electromagnet 156 of the ratchet mechanism attached to the shaft 28, as shown in Fig. 10 and described later, to move the tape 24 to the left one step.

The current flowing through the switch 61 is also supplied to the electromagnet 62 which pulls the hammer arm 51 to the left in Fig. 2 while the clutch 50 is engaged, thereby rotating the worm 40 sufficiently to move the yoke 27 away from the stop 42 the width of the letter "a". This movement of the yoke 37 of course is correlated with the simultaneous action of the positioning generator 45 and the actuation of the proper character wheel 107 to display the letter "A" as the first character in the composed line.

Current through the switch 127 is supplied from the main current wire 110 through a wire 128, and a normally closed switch 129 to the switch 127, for the operation of the clutch 50. Current passing through the switch 127 as explained above, goes to the clutch 50 directly therebelow and through a wire 130 to the closed side of a switch 131 and to the now closed switch 61.

The switch 131 is normally biased in closed position, as shown, and switches 61 and 113 are also normally in the positions shown, so that current is always maintained through these switches except for the momentary interruptions made by opening switches 129, 127, 131, 61 and 113. Current is therefore maintained normally on the clutch 50 and on electromagnet 62 to keep the arm 51 in engagement with the stop 63, and on electromagnet 156 to keep the tape stepping ratchet mechanism with the ratchet bar 155 pulled down.

When the "N" key is actuated, an electromagnet 132 operates the seven adjacent switches 133 of a relay, the same as described above in connection with the switches 118, the only difference being that a different signal is printed on the tape. In this instance, the first two switches send current through a pair of wires 134 to energize printing magnets 26, numbered 1 and 5, which is the signal for "N," this signal being printed on the tape in the manner described above in connection with the operation of the "A" key.

When the "D" key is struck, an electromagnet 135 is energized to close the seven adjacent switches 136, to carry out the same operations described for switches 118. The first two switches supply current from the wire 110 through a pair of wires 137 to the printing magnets 26, numbered 3 and 5, which is the signal for "D." All other operations and wiring are the same as that described above in connection with the operation of the "A" key, it being understood of course that the rack 105 moves successively from the character wheel displaying "A" to the next which displays "N," and to the following one which displays "D." The "N" and "D," or the "lower case" "n" and "d" wires leading to the wheels 107 are shown in Fig. 10, respectively, below the "A" and "N" keys.

*The space key circuit*

After operating the mechanism to compose the word "and," the next step is the actuation of the space key. When it is struck, current is supplied to an electromagnet 138 which operates a relay including nine adjacent switches 139 to supply current from the wire 110 to the various parts of the apparatus, as shown. The first, second and third switches supply current through the connected three wires 140 to the signal printing magnets 26, numbered 2, 3 and 4, which is the "space" signal printed on the tape.

The fourth of the switches 139 sends current through a wire 141 to all of the character wheels 107, so that the next wheel, which is grounded to the ratchet bar 105, displays a blank for space. The fifth switch is connected through a wire 142 to the wire 122 and therefore to the polarized relay 123, to set up a circuit and carry out the functions described above with respect to that relay. The fourth and fifth switches in their normal positions, as shown, when the space key is released, are connected by wires 143 and 144, respectively, to wires 125 and 126, to supply current and to effect the operations described above in connection with the release of the "A" key. These operations are also described in detail above in connection with Figs. 1 to 3.

The sixth switch actuated by the operation of the space key supplies current through a wire 145 to electromagnet 88 which pulls down a ratchet bar 146 carrying a pawl 147, for operating a ratchet wheel 148 fixed to the pinion 87 or its shaft, which moves the plate 86 shown in Fig. 1. The pawl 147 is normally out of engagement with the ratchet wheel 148 but is urged by a spring so that when the bar 146 is operated the pawl engages the ratchet wheel. The pivoted bar 146 may be moved to its normal position against a stop by a spring, as shown.

The seventh switch operated by the space key is connected through a wire 149 to a polarized relay 150 which closes a switch 151 to supply current from the wire 128 to the electromagnetic clutch 67, which is energized for operating the worm 39, for moving the spacer yoke 38 to the right. While the current is held on this clutch 67 by the relay 150, after the space key is released, current is supplied through wires 144 and 126 and switch 124 to the electromagnet 173 which pulls the arm 70 down, thereby rotating the worm 39 to move the yoke 38 one space to the right. It will be noted that the clutch 56 is connected in parallel with the electromagnet 73 and that it will be energized to set up the operations described above for moving the yoke 37 the normal "N" space to the right. When the switch 60 is closed by the operation of the clutch 56, current is supplied through a connecting wire 152 to the opposite side of the polarized relay 150 and to ground, opening switch 151. The relay 123 is also shifted as described above.

The eighth and ninth switches 139 of the space key connect into the side of the selector switch 108 to control the selection of the correct space pin by operation of the motors 52 and 55. When the space key is released, the switches 4 and 5 in their normal position energize various parts of the apparatus in the manner described above for the "A" key.

The tape shifting mechanism

Whenever a signal spot or combination of spots is printed on the tape 24, the tape is then shifted one space to the left by the operation of a spur wheel 154 attached to the lower end of the shaft 28, as shown in Fig. 1. The arrangement is more completely shown in Fig. 10 in which a pawl for operating the spur wheel 154 is pivoted to and mounted under a pivoted bar 155 and urged against a stop by a spring thereon. The bar 155 is also retracted against a stop by a spring, the bar being actuated by an electromagnet 156 wired in parallel with the electromagnet 62 through the switch 113. Current is normally maintained on the electromagnet 156 so that the bar 155 is held down in the position shown in Fig. 10.

It will be noted that in all the operations in which movement of the tape a step to the left is involved, the circuit is first broken by the opening of one or more of the switches leading to the wire 128. The shaft 28 is not directly connected to the clutch 92, but the end of the shaft carries a disc which rotates freely with the shaft and is used as a part of the clutch mechanism when the clutch 92 is energized, as explained later.

The word key circuit mechanism

The word "and" may be applied in code to the tape 24 by the wiring arrangement shown in Fig. 10 without actuating the individual keys for each letter. The "and" key which is shown directly below the "space" key illustrates the operation of the mechanism in writing various common words. The "and" key includes a double switch so that when the key is pressed, current is supplied through a wire 157 to an electromagnet 158 which pulls an insulated arm 159 against the action of a spring thereon, to the left over three contacts, as shown which are connected respectively to the "A," "N" and "D" electromagnets 117, 132 and 135. The arm 159 comes to rest on the contact for the "A" key, and as soon as the "and" key is released, current is supplied through a wire 160 and the arm 159 to the "A" key magnet, so that all the operations described above in connection with the actuation of the "A" key are carried out.

When the electromagnet 158 is de-energized upon release of the "and" key, the arm 159 starts to move to the right across the three contacts in succession, but its speed is slowed by a dash pot 161 mounted on a continuation of the shaft of the electromagnet 158. The electromagnets 117, 132 and 135 are therefore energized and de-energized in succession so that the code signals for the letters "a," "n" and "d," are successively applied to the tape 24.

The caps, numeral and style of type circuits

The keys for "Caps," "Numeral" and "Italics" directly below the "Lower-case" key, actuate apparatus analogous with that operated by the "Lower-case" key. Other style of type keys may be provided, such as a "Standard" type key, of which the "Italics" key and its circuit is an example. All of these keys are therefore wired into the wire 111 to actuate the electromagnet 112 to open the switch 113 and release ratchet bar 155. The actuation of the "Caps" key also supplies current through a wire 162 to an electromagnet 163 which closes a relay of three switches associated therewith, to supply current from the wire 116 to signal applying magnets 26 numbered 1, 4 and 5, which is the signal for the "Caps" key. A branch wire 164 from the wire 162 leads to the rotor 109 of the selector switch, to make a setting for capital letters. Release of the "Caps" key permits switch 113 to close and actuate the electromagnet 156 for moving the tape one step.

When the "Numeral" key is struck, current is supplied through a wire 165 to an electromagnet 166 which closes a relay of three switches associated therewith, thereby supplying current from the wire 116 to signal printing magnets 26 numbered 1, 3 and 4, which is the signal used before operating a key to print a numeral or series of numeral signals on the tape. The wire 165 is connected by a branch wire 167 to the rotor 109 of the selector switch to set the switch for measuring the widths of the numerals. The release of the "Numeral" key permits the switch 113 to close so that the tape moves a step forward.

When the "Italics" key is actuated, current is supplied through a wire 168 to an electromagnet 169 which closes two switches associated therewith, to supply current from the wire 116 to signal printing magnets 26 numbered 2 and 4, which is the signal for "Italics." At the same time a branch wire 170 supplies current from the wire 168 to the rotor 109 of the selector switch, to set it for measuring letters in italics. Release of the "Italics" key permits switch 113 to close so that the tape 24 is moved to the left one step.

The cancellation key circuit

The cancellation key shown directly under the "and" key in Fig. 10, is actuated after the operator strikes a character key in error. While the functions of the apparatus shown in Figs. 1 to 3 were described above in connection with the cancellation of a character signal, the circuits involved are shown in Fig. 10; it being understood of course that in order to cancel the character of a key which was struck in error, it will be necessary to re-actuate that key in conjunction with the operation of the cancellation key. In general, the cancellation of a character is accomplished by reversing the sequence in which certain of the mechanisms are operated from that used in the normal operation of the particular character key.

Assuming, for example, that the "A" key has been operated by mistake, and that the corresponding signal has been printed on the tape, displayed on one of the character wheels, and measured off by the yoke 37, the cancellation key is stuck to send current from the wire 110 through a wire 171, to energize electromagnets 172 and 173, the latter of which shifts the switch elements of switch 131 to release the bar 155. The electromagnet 172 shifts five switch elements of a relay, to the left. The movement of the fifth element opens the switch 129, thereby cutting off the current supplied normally from wire 128 through the switch 127. The first and second elements connect wires 141 and 7a, so that current will be supplied to the character wheels 107 when the "A" key is struck to supply current by wire 7a. The third and fourth switch elements connect up the wire 122 with the left-hand side of a polarized relay 174, so that when the "A" key is struck, current will not only be supplied to the polarized relay 123 to close switch 124, but also by the same wire 122 to the relay 174, to close a switch 175.

As soon as the cancellation key has been struck, and while it is held, the "A" key is actuated to supply current to the relay 123 and through the switch elements 3 and 4 operated by the magnet 172 to the polarized relay 174 to close the switch 175. This latter switch is directly connected to the current supply of the line 128 so that current is immediately supplied to engage the clutch 50 and through the wire 130, the switch 131 and a wire 176, to a ratchet operating electromagnet 177. The operation of this magnet pulls down a bar 178 having a spring-held pawl thereon, to move a spur wheel 179 one step. This spur wheel is attached to a shaft and sprocket or drum unit, shown at the upper right in Fig. 1, for moving the tape 24 step-by-step to the right. The pawl on the bar 178 is normally free of the sprocket so that the tape may be readily moved in the opposite direction by the means described above.

A switch 180 is associated with the bar 178 so that by the time the bar has been pulled down approximately its full stroke, it moves the switch member against a contact, connected into the wire 176, so that current is supplied from the wire 176 through a wire 181 to the separately grounded signal applying magnet 26, numbered 6, which make a single spot cancel signal directly under the signal to be cancelled, that is, the signal for "A." Current supplied to the wire 176 is simultaneously sent through a wire 181a to an electromagnet 181b which opens a normally closed switch in the circuit to ground of the signal applying magnets 26 numbered 1 to 5, so as not to reapply the signal of the character being cancelled.

After both the "cancel" and "A" keys are struck and released, the polarized relay 174 keeps the switch 175 closed and the clutch 50 engaged until after the actuation of the clutch 56, which is energized upon release of the "A" key. When the arm on clutch 56 moves arm 51 and yoke 37 a step to the left, and also closes switch 60, current will be supplied through the switch 60 and a connecting wire 182, to the right-hand side of polarized relay 174, to pull open the switch 175 and thereby release clutch 50. Current from wire 125 through switch 60 also changes the relay 123 to open switch 124 and close switch 127 so that electromagnets 62 and 156 will be energized. The tape 24 is moved a step to the left.

In these operations the clutch 50 is de-energized before magnet 62 is energized to pull the arm 51 to its normal position. It will be understood that motors 52 and 55 are actuated by the operation of the "A" key so that the proper pin is contacted by the arm 51, which is measured in this instance by the movement of the arm from its stop to the pin. In the particular example, the pin cylinder will not be moved because the character signal cancelled was the last signal recorded on the tape.

*Clearance key circuit*

The clearance key is the lowermost key shown in Fig. 10, and when it is struck, current is supplied from the wire 110 through a wire 183, to the mechanism shown adjacent the lower right-hand corner of the view. The wire 183 is connected to the clutch 92 and to motor 91, shown also in Fig. 1, and used for advancing the tape 24 sufficiently to clear the composed line on the tape by rotating the shaft 28. However, this operation does not take place until current is cut off from the electromagnet 156, so that the ratchet bar 155 is released. This is done by opening a switch in the wire between magnets 162 and 156 by an electromagnet 184 wired to the wire 183 by a branch wire 183a. When the motor 91 commences a revolution, the knob on the cam 92a permits the switch 92b to close, thereby providing a holding current on the motor 91 and clutch 92.

The wire 183 also supplies current through a connecting wire 185 to the brake release magnets 49 and 69, shown also in Fig. 1, thereby releasing the clock springs in the casings 46 and 65, so that the yoke 37 is moved rapidly into engagement with the stop 42, and the yoke 38 is moved rapidly until the head 39a is engaged, as in Fig. 1. Current supplied through the line 185 also actuates electromagnet 88a which takes a catch, as shown, out of the spur wheel 148, so that the simultaneously energized motor 87a can rotate the sprocket 87 and return the plate 86 to its initial starting position. Current is also supplied from the wire 183 by a branch wire 183b to an electromagnet 186, which closes an associated switch to supply current from the wire 128 to the wire 141 leading to the character wheels 107, so that all wheels are brought to blank or space as the yoke 37 moves to its stop 42.

After the clearance key is released, the holding switch 92b maintains current on electromagnets 49, 69, 88a, 184 and 186, clutch 92 and motors 91 and 87a for a sufficient time for the cam 92a to make a complete revolution, and permit the actuation of the necessary equipment. Current flows from wire 116 and back through the wire 183 to the clutch 92 and magnets 184 and 186 after the clearance key is released. When the cam opens the switch 92b, all the electromagnets and motors referred to immediately above are de-energized. The apparatus is now ready to begin the composition of a new line of text matter.

In the operation of the apparatus as described above, it will be apparent that the yoke 38 plus the wedge units assembled thereagainst mark the right-hand margin for any line to be composed when the apparatus is in its cleared position, as shown in Fig. 1. If in composing a line the yoke 38 were not moved and the line came out even, the yoke 37 would just come into engagement with the first wedge unit. Any change in the length of line therefore is made by the adjustable stop at the left of yoke 37.

In making up some lines of text matter, as for example two or three words at the end of a paragraph, there will be a considerable part of the line which will not be taken up by text matter. This will be filled in by a procedure somewhat analogous to that presently in use, that is, by using "slugs" an em in width to fill in the line. This is done, for example, by wiring the apparatus so that the numeral key is actuated, after which the operator actuates the "M" key to measure off the slugs. When the end of the line is reached the justifying key is actuated in the usual manner, so that the composed part of the line will be correctly justified. The printing apparatus will of course print a "slug" signal on the tape for each "slug."

The tape or strip used for making the record may be of any desired width and in fact may be relatively wide. However, it is advantageously made of a washable, clear, plastic material so that the printed spots and other signals may be readily washed off and the tape reused. Vellum paper, transparent cellulose, or other film material may be used so that in the photographic apparatus a light may be shined through the strip and the various signals and bars picked up by the signal sensing apparatus.

The signal spots or punch holes such as those shown on the tape in Fig. 1 and used for the various characters may correspond to similar signal systems previously used or any desired code may be employed, it being understood that some of the bar signals, as for example the justification or space signal bar, may vary in length from line to line, as an actual measure of the space, or representing such measurement. In the use of the record tape the type size signal bar is utilized for actuating mechanism associated with the camera, so that it is focused to give the desired size of type. It will be understood that the record tape includes a code signal for each space and that when this actuates the reproducing apparatus the space is measured off according to the length of the justification signal bar for that particular line of text matter.

While the justification signal is shown as a bar this may advantageously be accompanied by a spot or punch signal as a control means for initiating the operation of space measuring mechanism of the photographic apparatus. The electromagnets 26 may be used to punch signals in the strip or record band instead of print spots, and more than the number shown may be used to take care of signals containing more than five spots, or for applying other control signals below the regular character signals. It is contemplated that as many as nine vertically spaced control signal positions may be advantageously employed.

The apparatus has been described in connection with applying a length-of-line signal to the tape. This, however, is not necessary since the length of line is determined by the position of the member 42 which determines the free space between the yokes 37 and 38 at their starting positions. This length is therefore set at the keyboard and the photographic apparatus reproduces the same length without a signal. The keyboard may have a signal bell in addition to the member 103 so that the operator knows without looking when the end of the line is near. The operator, however, will usually be following the character wheels 107, which are small Selsyn D. C. motors. The apparatus is arranged to be operated by D. C. current, and most of the elements and electrically-operated mechanisms used in the apparatus are purchasable on the market.

The photographic apparatus for making use of the record tape made in accordance with the present invention advantageously includes some mechanisms which are similar to those described above. For example, the character measuring mechanism may be essentially the same, so that a pin cylinder and its related apparatus is employed for moving the photographic negative the width of the particular character to be photographed.

From the foregoing description it will be readily understood by those skilled in the art that certain modifications may be made in the wiring arrangements as illustrated, and that the structures of certain of the mechanisms may also be changed or used in different form. Such changes and modifications are contemplated as coming within the spirit and scope of my invention as defined by the appended claims.

What I claim is:

1. An apparatus for producing a strip record of a justified line of text matter of predetermined length on which the characters and spaces of the line of text matter are represented by code signals, comprising a track carrying positionable elements, key-operated automatic mechanism including an electrical circuit for successively recording on the strip the code signals representing the characters and spaces in the line and for successively moving a positionable element on said track a distance corresponding to the width of each of the successive characters and a normal space width for each of the spaces of the line of text matter, said automatic mechanism including means for separately moving a second positionable element on said track in the same direction as the first to separately measure off thereon a duplicate normal width for each space in the line, key actuated mechanism for dividing the total space distance separately measured off on the track plus any excess or deficiency in the measured line by the number of spaces in the line thereby determining the exact width for the spaces in the line of text matter, and mechanism operated by said key actuated dividing mechanism for recording a symbol on the strip representing such space width in association with the code signals for the particular line of text matter.

2. An apparatus as defined by claim 1 in which said key operated automatic mechanism includes a character width determining means for each character and means associated therewith for controlling the movement of the character measuring positionable element on the track.

3. An apparatus as defined by claim 1 in which said key operated automatic mechanism includes a pin cylinder having pins of different length projecting therefrom corresponding to the width of the various characters to be used in composing the line of text matter, and motor means for controlling the positioning of said cylinder for each character.

4. An apparatus as defined by claim 1 in which the track carries a pair of positionable elements initially positioned with a free space therebetween equal to the line length and in which said key operated mechanism moves said elements in the same direction.

5. An apparatus as defined by claim 1 which includes a separate space key, and electrically actuated mechanism operatively associated therewith for moving both of said elements on the track and in the same direction each time the space key is actuated.

6. An apparatus as defined by claim 1 in which the key operated automatic mechanism includes an electric circuit associated with means for recording character and space signals on the record strip and with means for moving the positionable elements on the track.

7. An apparatus as defined by claim 1 in which the total-space dividing mechanism includes a plurality of wedge units carried on the track between the positionable elements, and means for selecting a wedge unit for each space in the line of text matter.

8. An apparatus as defined by claim 1 in which the key actuated mechanism for dividing the total space distance includes a plurality of wedge units carried on the track between said positionable elements, means for selecting a wedge unit for each space in the line of text matter, means for moving the selected wedge units equally to completely take up the free space between said positionable elements and thereby dividing the total free space between the positionable elements by the number of selected wedge units, and means associated with the means for operating said wedge units for indicating the resultant space width for each space in the line of text matter.

9. An electrically operated apparatus for producing a strip record bearing code signals or representations of a line of text matter, which comprises a keyboard of switch operating keys including character keys, a space key, a justification key and a cancellation key, electrically operated mechanism actuated by the character keys for successively recording on the strip record code signals representing the characters of the keys actuated and for moving the strip record forward step by step, an electrically actuated mechanism controlled by the space key for recording a space signal on said record strip, electrically actuated mechanism operated by the cancellation key for moving said record strip backward step by step and for recording on the record strip a cancellation signal adjacent to the signal of the character to be cancelled, and electrically operated mechanism actuated by the justification key for recording on the record strip a justification signal, the length of which is proportional to the space width between words necessary for justifying a line of text matter corresponding to the code signals previously recorded on the record strip.

10. An apparatus as defined by claim 9 in which the mechanisms operated by the character keys and the cancellation key include electrical circuits for supplying current for the movement of the strip record, the circuit of the concellation key including means for breaking the portion of the character key circuit for supplying current to the means for moving the strip record forward.

11. In an apparatus for producing a justified line of text matter including mechanism for measuring off the widths of characters used in the line of text matter, the improvement which comprises a frame, a pair of spaced positionable members mounted for movement on the frame, said members being initially positioned with a free space therebetween equal to the length of the desired line of text matter, mechanism for moving one of said members step-by-step toward the other member to measure off the widths of the characters in the line of text matter, said mechanism including a worm mounted parallel to said frame and threaded into said one member, an arm associated with an end portion of said worm and arranged to rotate said worm, means for moving said arm through a predetermined arc to thereby rotate said worm and move said one member a predetermined distance on said frame, and means for varying the arc through which said arm is moved in accordance with the character width to be measured off on said frame.

12. An apparatus as defined by claim 11 in which said arm is connected to the end portion of said worm by a clutch mechanism whereby said worm may be rotated in one direction, and a brake associated with the worm for retaining it in the position to which it is rotated by said arm.

13. An apparatus as defined by claim 11 in which said arm is mounted for movement between a stop member and a mechanism for varying the arc through which said arm may be moved, said mechanism comprising a pin cylinder having vertical and horizontal rows of pins projecting therefrom for engagement by said arm, and means for presenting a predetermined pin for contact by said arm according to the width of the character to be measured off on said frame.

14. An apparatus as defined by claim 11 in which the means for determining the arc through which said arm is moved includes a pin cylinder having vertical and horizontal rows of pins projecting therefrom, means for actuating said pin cylinder to present a predetermined pin for engagement by said arm, and a clutch mechanism between said arm and the end portion of said worm.

15. An apparatus as defined by claim 11 additionally comprising key actuated mechanism including an electric circuit for moving said arm and for determining the arc through which said arm is moved.

16. In an apparatus for producing a justified line of text matter including mechanism for measuring off the widths of characters used in the line of text matter, the improvement which comprises a frame, a positionable member carried by the frame, mechanism for moving said member step-by-step across the frame successive distances corresponding to the widths of the characters and spaces in the line of text matter, said mechanism including a worm threaded into said member, an arm associated with an end portion of said worm and arranged to rotate said worm, means for swinging said arm through a predetermined arc to thereby rotate said worm and move said member a predetermined distance, and means for varying the arc through which said arm is swung in accordance with the character and space widths of the line of text matter.

17. An apparatus as defined by claim 16 in which an electromagnetic clutch is mounted between said arm and worm, electrical means for moving said arm through its arc, and a control means including an electrical circuit for energizing first said clutch and then said electrical means.

18. An apparatus as defined by claim 17 in which the means for varying the arc comprises a cylinder mounted adjacent said arm having pins of varying lengths projecting therefrom, and motor means responsive to said control means for presenting a predetermined pin for contact by said arm prior to energizing the electrical means for moving said arm.

19. In an apparatus for producing a justified line of text matter including mechanism for measuring off the widths of characters and spaces used in the line of text matter for effecting the justification thereof, the improvement which comprises a frame, a pair of spaced positionable members mounted on the frame, said members being initially positioned with a free space therebetween equal to the length of the desired line of text matter, mechanism for moving one or both of said members step-by-step in the same direction on the frame to measure off the widths of the characters and spaces in the line of text matter, said mechanism including a worm for each member mounted in line and parallel to said frame and threaded into the respective members, an arm associated with the outer end portion of each worm and arranged to effect its rotation, and means for moving each arm through a predetermined arc to thereby rotate its worm and move the member thereon a predetermined distance on said frame.

20. An apparatus as defined by claim 19 in which the frame is mounted in a substantially horizontal position and a plurality of wedge units are carried thereon between said members, a justified-line space measuring bar mounted parallel to said wedge units, a movable plate mounted under said space measuring bar and slidable under said wedge units, means for moving said plate under a wedge unit for each space in the line of text matter simultaneously with the movement of the positionable member which is moved away from the other member, and means for elevating said plate, said selected wedge units and said space-measuring bar to take up the space between said positionable members after the line of text matter has been composed.

21. An apparatus as defined by claim 19 in which a plurality of space-dividing units are mounted on the frame between said positionable members, means for selecting a unit for each space in the line of text matter, means for operating said units after composing the line of text matter simultaneously and equally to completely take up the free space remaining between said positionable members thereby dividing said remaining free space by the total number of spaces in the line of text matter, and means for indicating the resulting space width.

22. An apparatus as defined by claim 19 in which the mechanism for moving said members includes a key operated electrical circuit, an electromagnetic clutch between each arm and its worm, circuit means for energizing said clutches, and said circuit including an electromagnet for moving each arm.

23. An apparatus for producing a strip record of a justified line of text matter of predetermined length on which the characters and spaces of the line of text matter are represented by code signals comprising a measuring frame carrying a pair of spaced yokes positioned initially with a free space therebetween equal to the line length, key operated automatic mechanism including an electrical circuit for successively recording on the strip the code signals representing the characters and spaces in the line of text matter and for successively moving one yoke on said frame a distance corresponding to the width of each of the successive characters and a normal space width for each of the spaces of the line of text matter, a space key, automatic mechanism actuated by the space key including means for separately moving the other yoke on the frame in the same direction as the first to separately measure off thereon a duplicate normal width for each space in the line, key actuated mechanism for dividing the free space remaining between the yokes by the number of spaces in the line after the line of text matter is composed thereby determining the exact width for the spaces in the line of text matter, and mechanism operated by said key-actuated free space-dividing mechanism for recording a symbol on the strip representing such space width in association with the code signals for the particular line of text matter.

24. An apparatus as defined by claim 23 wherein a cancellation key and an electrical circuit is provided therefor including means for applying a cancellation signal to the tape adjacent a character to be cancelled, and means for moving the first yoke the width of the character to be cancelled away from the other yoke.

25. An apparatus as defined by claim 23, wherein key-actuated mechanism is provided for releasing said yokes after a line of text matter has been composed, and spring means for returning said yokes to their initial spaced positions.

26. An electrically operated apparatus for producing a strip record bearing code signals or representations of a line of text matter, which comprises a keyboard of switch operating keys including character keys, a space key, a cancellation key, and a justification key, electrically operated mechanism actuated by the character keys for successively recording on the strip record code signals representing the characters of the keys actuated and for moving the strip record forward step by step, electrically actuated mechanism controlled by the space key for recording a space signal on said record strip, and electrically actuated mechanism operated by the cancellation key for moving said record strip backward step by step and for recording on the record strip a cancellation signal adjacent to the signal of the character to be cancelled, the said mechanism actuated by the character keys including a track for use in measuring off the widths of the various characters and normal spaces in a line of text matter, a pair of positionable elements mounted on said track and initially positioned with a free space therebetween equal to the line length, and means actuated upon the operation of a character key for moving one of said positionable elements toward the other positionable element a distance corresponding to the width of the character for the particular key actuated.

27. Electrically operated apparatus as defined by claim 26, wherein the electrically actuated mechanism controlled by the space key includes means for moving the other of said positionable elements away from the element positioned by actuation of a character key a distance corresponding to the normal space width upon actuation of the space key.

28. Electrically operated apparatus as defined by claim 26, wherein the electrically actuated mechanism controlled by the space key includes means for moving the other of said positionable elements away from the element positioned by actuation of a character key a distance corresponding to the normal space width upon actuation of the space key, and additionally including a plurality of space dividing units mounted on the track between said positionable elements, and means actuated by the space key for selecting one of said units for each actuation of the space key in a line of text matter.

29. An electrically operated apparatus for producing a strip record bearing code signals or representations of a line of text matter, which comprises a keyboard of switch operating keys including character keys, a space key, a cancellation key, and a justification key, electrically operated mechanism actuated by the character keys for successively recording on the strip record code signals representing the characters of the keys actuated and for moving the strip record forward step by step, electrically actuated mechanism controlled by the space key for recording a space signal on said record strip, and electrically actuated mechanism operated by the cancellation key for moving said record strip backward step by step and for recording on the record strip a cancellation signal adjacent to the signal of the character to be cancelled, the said mechanism operated by the character keys including a relay for selecting the code signal to be recorded on the strip record and a branch circuit including a polarized relay through which current is supplied for moving the record strip forward step by step.

30. A mechanism for locating a member in a position establishing a space value to be employed in spacing words in a line of text matter for justifying the same, comprising a pair of space determining members at least one of which is capable of being moved toward and away from the other and of being initially held in selected spaced relation indicative of the length of the line of text matter to be justified, means operable after said initial line length space has been established for moving at least one of said members toward the other an amount representative of the summation of the widths of the characters employed in said line of text matter, whereby to provide a remainder space representative of the selected line length minus the summation of the widths of the characters therein, wedge means mounted for movement transversely with respect to said pair of members and into the remainder space defined thereby, means giving to said wedge means an effective space occupying width representative of the number of word spacings employed in said line of text matter, means for moving said wedge means into said remainder space as far as permitted by the extent thereof, and a member for establishing a space value for word spacings in said line of text matter operatively connected to and positioned by said wedge means.

31. A mechanism for locating a member in a position establishing a space value to be employed in spacing words in a line of text matter for justifying the same, comprising frame structure, a positionable member mounted for movement on said frame structure and capable of being initially located in position indicative of the length of the line of text matter to be justified, means operable after said initial line length space has been established for moving said member step by step along said frame structure successive distances corresponding to the widths of the characters in said line of text matter, said member moving means including a worm threadedly associated with the member, an arm associated with an end portion of said worm and adapted to rotate the worm upon oscillating movement of the arm, means for oscillating the arm through a predeterminated arc to thereby rotate the worm and move said member a predetermined distance, and character measuring means for determining the arc through which said arm is rotated in accordance with the varying widths of the characters comprising said line of text matter.

HOWARD B. ACKERMAN.

REFERENCES CITED

The following references are of record in the file of this patent:

UNITED STATES PATENTS

| Number | Name | Date |
|---|---|---|
| 1,732,049 | Hunter | Oct. 15, 1929 |
| 2,067,183 | Green | Jan. 12, 1937 |
| 2,067,185 | Green | Jan. 12, 1937 |
| 2,114,294 | Green | Apr. 19, 1938 |
| 2,398,457 | Wallach | Apr. 16, 1946 |
| 2,436,126 | Tholstrup | Feb. 17, 1948 |